May 12, 1953 — A. SKIRMENT — 2,638,105
BAFFLE FOR WATCH CLEANING MACHINES
Filed April 19, 1949
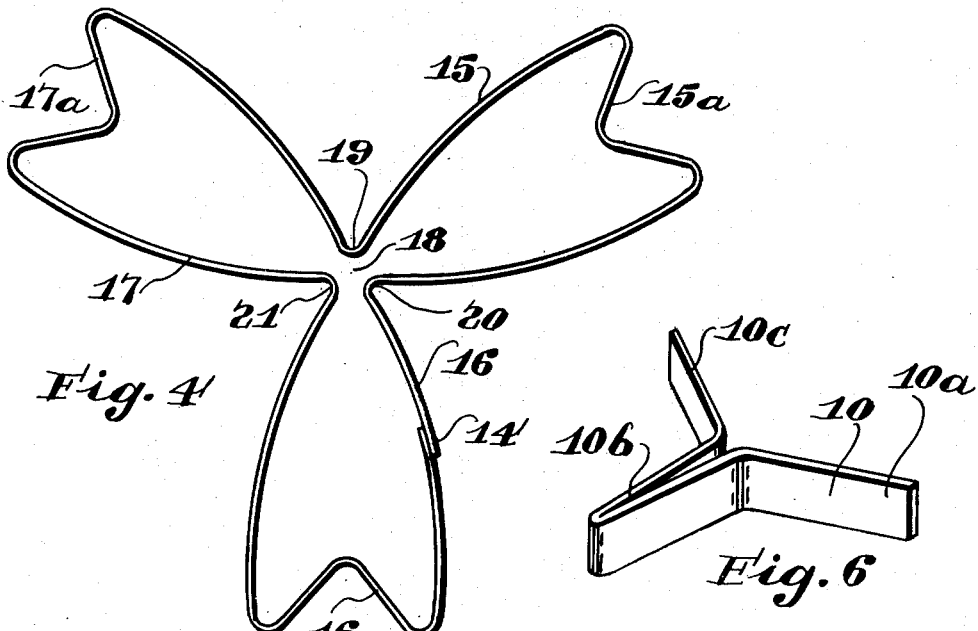
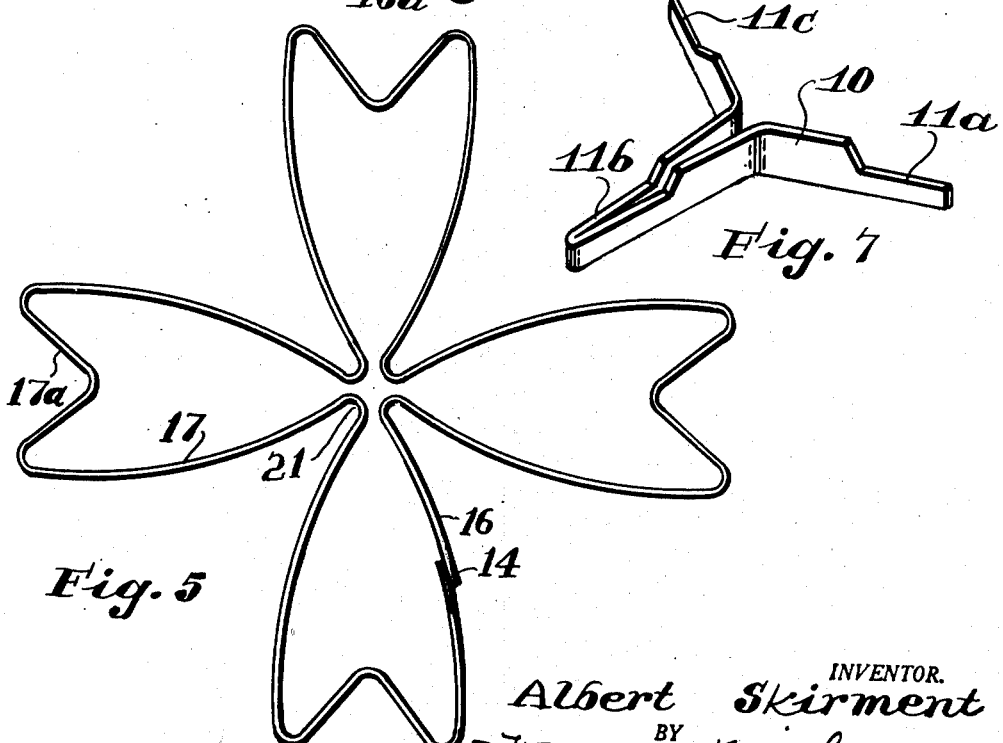

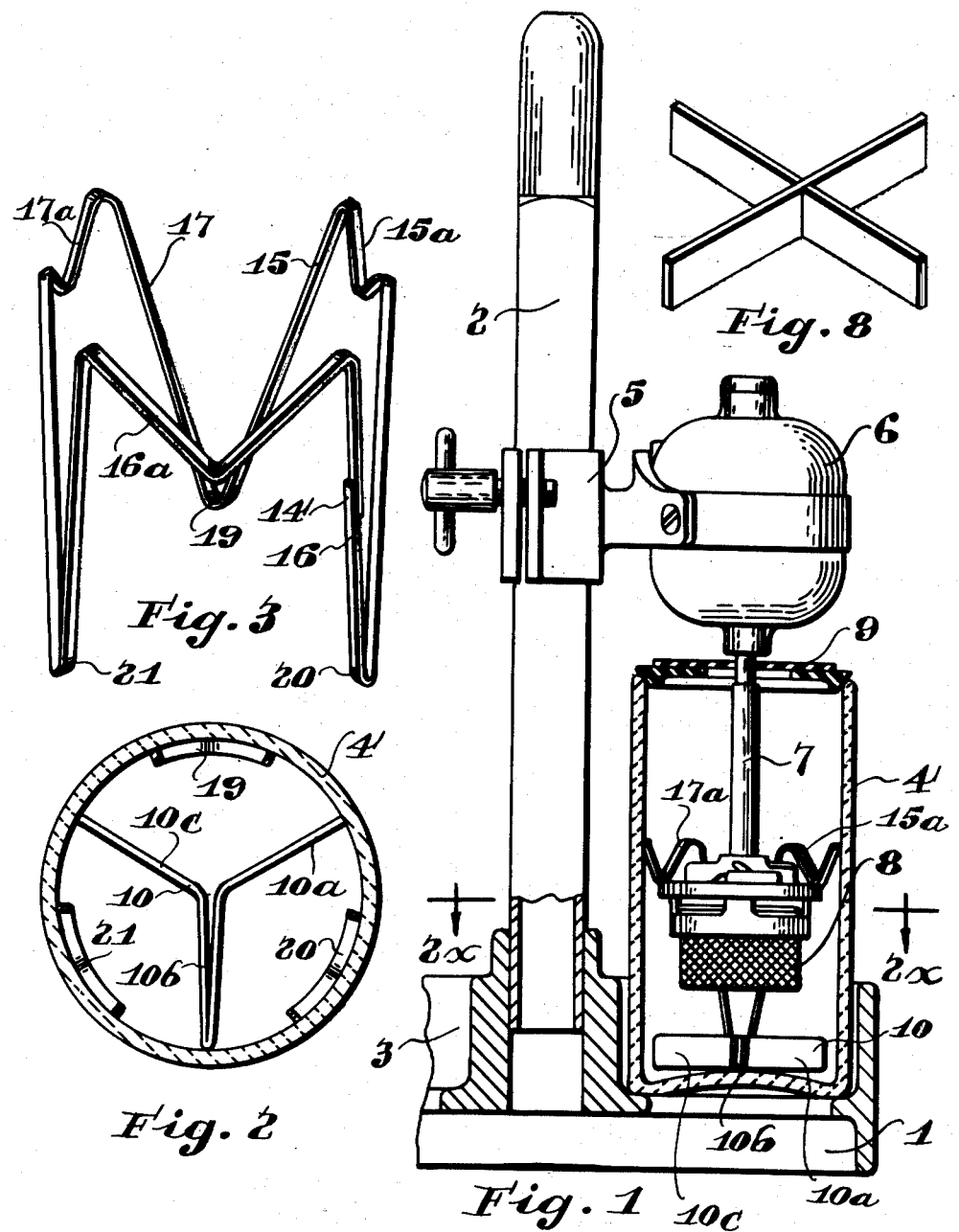

Patented May 12, 1953

2,638,105

UNITED STATES PATENT OFFICE 2,638,105

BAFFLE FOR WATCH CLEANING MACHINES

Albert Skirment, Rochester, N. Y.

Application April 19, 1949, Serial No. 88,315

3 Claims. (Cl. 134—183)

Watches must be taken apart from time to time and the parts of them must be washed and cleaned. Such parts are frequently washed and cleaned by putting them in a small wire mesh basket which is rotated at high speed in a cleaning solution or a series of cleaning solutions, which cleaning solutions are held in a cylindrical or square jar, much like a fruit jar, which jar is stationary.

As the basket is rotated at high speed, it causes the liquid to rotate in the jar as well and by centrifugal force the liquid in the center of the jar is lowered and is thrown away more or less from the basket and is piled up against the cylinder inside the jar, forming an air space having the shape of an inverted cone. The faster that the basket is rotated the smaller the angle of this cone becomes and the more the liquid is drawn away from the basket and the less effective it will be for the purpose of washing and cleaning the parts in the basket.

To overcome this tendency baffles are used on the inside of the jar.

I have invented baffles for the inside of the jar that overcome this tendency in that they catch the liquid as it flows away from the center of the jar and divert it back into the basket causing the liquid to flow through the basket with cross currents that more effectively clean the parts contained in the basket. In this way, the baffles prevent the liquid from piling up against the inside of the jar in which case the liquid would flow away from the basket and would flow less through the basket.

Another object of my invention is to make the baffles in such form so that they can be easily made and easily inserted in the jar and easily removed therefrom.

Another object of my invention is to provide a baffle that rests on the bottom of the jar, having arms extending radially from the center thereof.

I provide another baffle having a plurality of arms or sections that normally extend radially in a single plane from an open center thereof which arms can be sprung into an upright position so that they will contact with the cylindrical sides of the jar in which they are inserted, which baffles cooperate with each other for securing the desired results in securing the circulation of the liquid in the basket.

Another object of my invention is to form the last named baffle of a single piece of ribbon or flat coil of stainless steel, the ends of which are welded together or fastened together in any suitable manner. This ribbon is bent to form a plurality of sections that normally lie flat and extend radially from an open center, but which when inserted in the jar, the sections align themselves against the inside of the jar in an upright position or substantially at right angles to their normal position when removed from the jar.

Another object of the invention is to form each section of the last named baffle so that the sides thereof diverge from each other leaving a large open space between them, the outer or upper end of the baffle being bent inwardly at a considerable angle between the sides of the section.

These and other objects of the invention will be illustrated in the drawings, described in the specification and pointed out in the claims at the end thereof.

In the drawings:

Figure 1 is a side elevation, partly in section showing the apparatus in which my baffles are used.

Figure 2 is a horizontal section on the line $2x$, $2x$ of Figure 1 showing the baffles placed in the bottom of the jar.

Figure 3 is a perspective view of the baffles placed upright against the inside of the jar.

Figure 4 is a plan view of a baffle having three sections.

Figure 5 is a baffle similar to the one shown in Figure 4 and formed with four sections.

Figure 6 is a perspective view of the baffle used in the bottom of the jar which baffle has three prongs.

Figure 7 shows a modified form of the baffle shown in Figure 6.

Figure 8 shows a baffle for the bottom of the jar having four prongs.

In the drawings, like reference numerals indicate like parts.

In the drawings reference numeral 1 indicates a base made preferably of metal having an upright post 2 in the center thereof. In the base is a series of sockets 3, 3 in which a series of four jars can be set. On the post is a clamp 5 which supports an electric motor 6. This motor drives a shaft 7, which shaft on the lower end carries a wire mesh basket 8 in which the parts of a watch can be placed for the purpose of washing and cleaning them. The shaft 7 passes through a coverplate 9 that rests on top of the jar 4 and holds the liquid against splashing out of the jar. This jar is stationary and the basket is rotated therein at high speed which can be varied at will. The basket is submerged in the liquid. The liquid in the jar preferably comes above the top of the basket, but somewhere below the top of the upright baffle.

Before the basket is inserted in the jar, the baffles such as are shown in Figures 6, 7 or 8 are placed in the bottom of the jar. If the jar is a square jar, the baffle in the bottom of it will have preferably four prongs, one of which will reach into each corner of the jar, such as is shown in Figure 8. The baffle shown in Figure 4 is inserted into the cylindrical jar and if it is a jar having four sides, the baffle shown in Figure 5 will be used instead.

If the jar is of larger diameter, the same baffle can be used, but preferably each end of the baffle will be made wider as will presently be described.

The baffle 10 at the bottom of the jar is preferably made of a ribbon of stainless steel having a width of about 3/8" and is bent on itself so that it forms three prongs 10a, 10b, and 10c. Each of these prongs can be cut away at the outer ends to make them narrow as indicated at 11a, 11b and 11c in Figure 7. This is necessary when a jar of larger diameter is used and instead of one large basket carried centrally on the shaft, three small baskets are carried on the shaft instead. The small baskets can rotate in the space provided above the cut away portions 11a, 11b and 11c. If a square jar is used the baffles shown in Figure 8 will be used, formed of four prongs, one of which will reach into each corner of the jar.

The baffle shown in Figure 4 is made of a single piece of ribbon or flat coil of stainless steel, the two ends of which are first spot welded together as indicated at 14 in Figure 3. The ribbon of stainless steel is bent to form three sections such as are shown at 15, 16 and 17 in Figure 4. These sections normally lie in a flat plane and diverge from the common center 18 and the sides of each section are connected at the outer end by a bridge 15a, 16a, 17a.

The center of each of these bridges is bent inwardly so that the two sides of the bridge stand approximately at right angles to each other. In this form the baffle will be enclosed in a circle having a diameter of about 3½". If the baffle is to be used in a jar having a somewhat larger diameter, the bridge at the end of each section should be flattened out more or less so that the sides of each section will be spaced somewhat further apart. This increases the efficiency of the baffle and is desirable where the jar of larger diameter is used; especially if three baskets are carried on the shaft and are rotated thereby. In such case, each of the baskets must be filled with approximately the same weight of parts to avoid vibration and insure smooth running.

I have found that when the baffle is formed in this way and the outer ends of the three or four sections are sprung together, the inner ends 19, 20 and 21 of adjacent sections will spring apart so that the sections will then stand parallel to a central axis. The whole assembly can then be inserted in the jar, and each section will then lie against the inside of the jar in an upright position. I have also found that the inner ends 19, 20 and 21 of the sections should preferably be in the bottom of the jar, although they can be placed in the top of the jar with the bridges in the bottom of the jar if so desired.

I have also found that the inner sections 19, 20 and 21 can be sprung apart or turned inside out, so to speak, and the baffle will lie flat on any plane surface with the bridges at the center of the assembly.

The baffle shown in either Figure 6 or 7 will be placed flat in the bottom of the jar and the baffle shown in Figure 3 will be placed upright inside of the jar or will be placed inside of the jar in an upright position. The motor and basket will then be placed in the position shown in Figure 1 and the jar will be covered with the cover 9. The motor will then rotate the basket and the baffles will operate to retard the flow of the liquid centrifugally so that it will not flow much above the upright baffle, but will flow in ample cross currents across the basket and thus wash and clean the parts contained in the basket or baskets.

After the motor has rotated its basket in one jar, it can be raised up and lowered again with the basket inserted in a second jar having the same kind of baffles and liquid in it, in which the basket will be rotated to further wash and clean the parts. In like manner the basket can be rotated in the third and the fourth jar having the same liquid and baffles. The liquid in the first jar will wash most of the objectionable matter off of the parts and become foul and the liquid in the second and third and fourth jars will progressively be kept cleaner so that by the time the parts have been washed in four successive jars the parts will be perfectly clean and will be ready to be dried and assembled in the watch.

I claim:

1. A baffle adapted to be inserted into a container having side walls and a central axis, said baffle being formed from a single resilient ribbon of metal, the ends of which are joined together, said ribbon being bent to form a series of elongated baffle sections, each of which sections has sides that diverge from a common open center, the sides of each section being flared outwardly and being connected at the outer end by a bridge extending between respective adjacent sides of adjacent baffle sections, which sections normally lie in a single plane, said baffle having the outer ends of said sections sprung toward each other and lying on the side walls of said container with the width of the ribbon extending generally radially, and the elongated baffle sections extending generally radially from said central axis.

2. A baffle adapted for insertion in a substantially cylindrically walled vessel, said baffle being formed of a single resilient ribbon of material, the ends of which are joined together, said ribbon being bent to form a plurality of elongated V-baffle sections, each of which sections comprise leg portions connected by a V-bend, one leg portion of each section being connected to a leg portion of an adjacent section by a relatively short bridge section, the length of each leg portion being many times the width of said ribbon, whereby each leg portion may be bent to permit the insertion of the V-sections within the cylindrical vessel with the leg portions thereof extending substantially lengthwise with the plane of the ribbon projecting substantially radially to form lengthwise baffles, and said bridging portions lying in substantially chordal planes.

3. A claim in accordance with claim 2, in which the bridge portion is in the form of a relatively small v, the short legs of which join the leg portions of the baffle sections and form acute angles.

ALBERT SKIRMENT.

References Cited in the file of this patent

UNITED STATES PATENTS

| Number | Name | Date |
|---|---|---|
| 1,123,408 | Shimer | Jan. 5, 1915 |
| 1,654,466 | McQuaide | Dec. 27, 1927 |
| 1,907,366 | Regero | May 2, 1933 |
| 2,150,560 | Ozer | Mar. 14, 1939 |
| 2,414,971 | Moser | Jan. 28, 1947 |

FOREIGN PATENTS

| Number | Country | Date |
|---|---|---|
| 504,658 | Great Britain | Apr. 28, 1939 |